US008951374B2

(12) United States Patent
Dourdeville et al.

(10) Patent No.: US 8,951,374 B2
(45) Date of Patent: Feb. 10, 2015

(54) TUBE JOINT AND A METHOD OF BONDING TUBES

(75) Inventors: Theodore Dourdeville, Marion, MA (US); Dennis DellaRovere, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 1001 days.

(21) Appl. No.: 11/572,138

(22) PCT Filed: Jul. 16, 2004

(86) PCT No.: PCT/US2004/022927
§ 371 (c)(1),
(2), (4) Date: Jan. 16, 2007

(87) PCT Pub. No.: WO2006/019376
PCT Pub. Date: Feb. 23, 2006

(65) Prior Publication Data
US 2008/0093337 A1  Apr. 24, 2008

(51) Int. Cl.
*B29C 65/48* (2006.01)
*F16L 47/03* (2006.01)
*F16L 47/02* (2006.01)

(52) U.S. Cl.
CPC *F16L 47/03* (2013.01); *F16L 47/02* (2013.01)
USPC ..... 156/158; 156/296; 156/304.2; 156/304.3; 156/324.4

(58) Field of Classification Search
CPC ............ B29C 66/5221; B29C 66/5341; B29C 66/1142; B29C 66/52271
USPC ................ 156/158, 296, 304.2, 304.3, 324.4; 138/21.1
See application file for complete search history.

(56) References Cited

U.S. PATENT DOCUMENTS

| 3,920,268 A | * | 11/1975 | Stewing ................. 285/21.1 |
| 4,096,017 A | | 6/1978 | Wyke et al. |
| 4,429,907 A | | 2/1984 | Timmons |
| 4,549,919 A | | 10/1985 | Auberon et al. |
| 4,630,846 A | | 12/1986 | Nishino et al. |
| 4,836,586 A | | 6/1989 | Martin |

(Continued)

FOREIGN PATENT DOCUMENTS

| JP | 48-89367 | 11/1973 |
| JP | 48089367 A | 11/1973 |

(Continued)

OTHER PUBLICATIONS

Notice of Rejection in related Japanese patent application No. 2011-001225 mailed on Oct. 16, 2012; 6 pages (Continued)

*Primary Examiner* — Christopher Schatz
(74) *Attorney, Agent, or Firm* — Schmeiser, Olsen & Watts LLP

(57) ABSTRACT

The invention is a method of bonding a first fluid conduit (14) to one or more other fluid conduits (12) or elements such as an electrode (92) or heating element. The method comprises positioning a first fluid conduit (14) substantially in contact with the other fluid conduits or elements (12) wherein a bond region (16) is created. The bond region is wetted with a liquefied thermoplastic polymer (34) which is then subsequently cooled forming a substantially fluid tight bond between the first fluid conduit (14) and the other fluid conduits or elements (14).

22 Claims, 9 Drawing Sheets

(56) References Cited

U.S. PATENT DOCUMENTS

Figure 1:
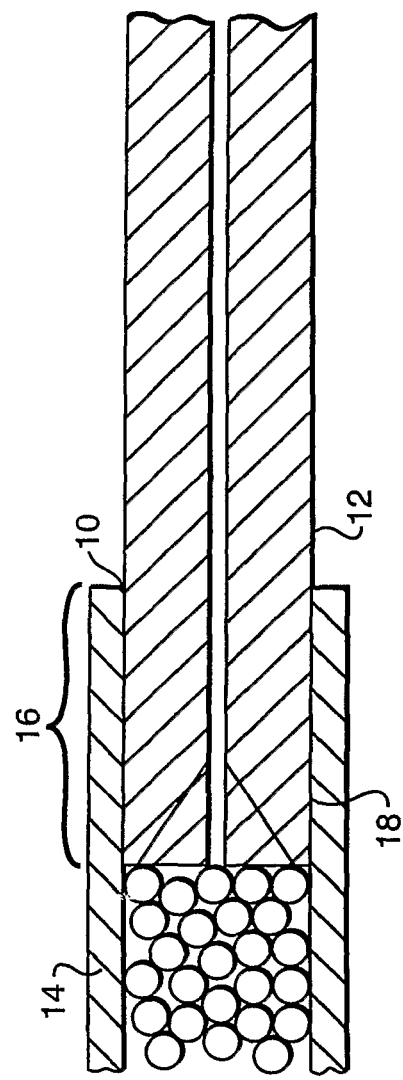

| | | | | |
|---|---|---|---|---|
| 4,842,305 | A | * | 6/1989 | Kistenich et al. ............ 285/21.2 |
| 5,171,796 | A | * | 12/1992 | Harris et al. ................. 525/435 |
| 5,384,391 | A | | 1/1995 | Miyata et al. |
| 5,540,464 | A | * | 7/1996 | Picha ............................ 285/328 |
| 5,653,777 | A | | 8/1997 | Semerdjian |
| 6,059,908 | A | * | 5/2000 | Van Beersel .................... 156/86 |
| 6,290,853 | B1 | | 9/2001 | Allmer et al. |
| RE37,692 | E | * | 5/2002 | Rashleigh et al. ............ 385/100 |
| 2003/0157286 | A1 | * | 8/2003 | Hesse et al. .................. 428/36.5 |

FOREIGN PATENT DOCUMENTS

| | | | |
|---|---|---|---|
| JP | 59-226790 | A | 12/1984 |
| JP | 62228159 | A | 10/1987 |
| JP | 02114171 | A | 4/1990 |
| JP | 5-96624 | A | 4/1993 |
| JP | 5-38488 | | 5/1993 |
| JP | 06240699 | A | 8/1994 |
| JP | 7-55784 | A | 3/1995 |
| JP | 07-180786 | | 7/1995 |
| JP | 9229282 | A | 9/1997 |
| JP | 9-280460 | A | 10/1997 |
| JP | 9292359 | A | 11/1997 |
| JP | 10089580 | A | 4/1998 |
| JP | 2001146987 | A | 5/2001 |
| JP | 2001304481 | A | 10/2001 |
| JP | 2002-103378 | A | 4/2002 |
| JP | 2003194281 | A | 7/2003 |
| JP | 2003-278623 | A | 10/2003 |
| JP | 2005002471 | A | 1/2005 |
| WO | 00/02723 | | 1/2000 |
| WO | WO 0002723 | A1 * | 1/2000 |

OTHER PUBLICATIONS

Final Rejection in counterpart Japanese patent application No. 2007-521442 mailed on May 29, 2012; 6 pages.

Official Action in related Japanese patent application No. 2007-521442, mailed on Oct. 22, 2013; 22 pages.

Official Action in related Japanese patent application No. 2011-001225, mailed on Oct. 29, 2013; 11 pages.

Notice of Allowance in related Japanese Patent Application No. 2011-1225, issued on May 28, 2014; 1 page.

Second Office Action in related Japanese Patent Application No. 2012-19015, mailed on Aug. 12, 2014; 2 pages.

* cited by examiner

TUBE JOINT AND A METHOD OF BONDING TUBES

CROSS REFERENCE TO RELATED APPLICATIONS

This application is related to and contains disclosure in addition to U.S. patent application Ser. No. 60/487,572, filed Jul. 15, 2003. The contents of the aforementioned application are hereby expressly incorporated herein by reference in its entirety.

BACKGROUND OF THE INVENTION

Creating lasting and effective tube joints is an important part of creating workable and efficient liquid handling systems. These joints come in hundreds of varieties, most requiring fluid tight seals. Tubes may be joined to other tubes, to manifold blocks, planar fluid circuits, detector flow cells, or other components such as heating elements or electrodes.

Creating fluid tight seals has always been a significant problem in the design of any fluid handling system. In a single liquid handling system such as liquid chromatography (LC) system, this issue must be confronted many times. An LC system has multiple ports, joints, connectors and fittings that all must be made substantially fluid tight to insure proper performance.

Reduction in LC column size along with increasing system operating pressure is an ongoing trend in the LC industry. In recent years, interest has grown in the practice of LC at capillary size scales, where the internal diameter of the analytical column may range from 800 microns to 50 microns or less. In order to effect connections between components of a system incorporating a 75 micron diameter column, the connecting tubing will typically be chosen to have an internal diameter of 25 microns or less.

The number of materials from which practical tubing of 15 to 25 micron internal diameter (the preferred range) can be formed or drawn, while maintaining the necessary strength, smoothness, concentricity, solvent resistance, and cost, is relatively few. Fused silica is one such material, and fused silica tubing is commercially available in a variety of internal and external diameters suitable for use in liquid chromatography at the capillary size scale. Commercial fused silica tubing is typically provided with a polyimide buffer coating which provides a degree of mechanical protection to the external surface of the tubing.

Additionally, as capillary size decreases, system operating pressure can increase. Conventionally, LC system operating pressure can range up to 5000 PSIG. There is a further desire to achieve very-high pressure (VHP) or ultra-high pressure (UHP) LC system operation in the range of 15,000-100,000 PSIG.

The reduction in sample size, eluting volumes, column and capillary size and the increase in system operating pressure has dramatically increased the demands on tube connections, joints and assemblies. The size and pressure of an LC system makes these joint geometries difficult to implement.

SUMMARY OF THE INVENTION

The invention comprises a method of bonding a first fluid conduit to at least one other fluid conduit or element by positioning the first fluid conduit substantially in contact with the other fluid conduits or elements and thus creating a bond region. The bond region is wetted with a liquefied thermoplastic polymer. The thermoplastic polymer is then cooled thereby forming a substantially fluid tight bond between the first fluid conduit and the other fluid conduits. Fluid conduit and tube are herein used interchangeably. The fluid conduits have portions that are proximal or distal sides and typically have proximal and distal openings or ends. An end may be opened or not.

The method comprises positioning tubes in a pre-determined joint geometry. This geometry can be any structure that involves a tube section interfacing with another tube section or element. The tube portions can be of the same tube or of different tubes. The tubes may interface at outer wall to tube opening or tube end, outer wall to outer wall, tube opening to tube end, outer wall to element, tube opening or tube end to element and tube opening to tube opening but the geometries are not limited to these. Openings along a tube may be created by drilling or other known methods. The joints should be low band-broadening connections. An element may be an electrode or heating element but is not limited to such. The area around where the tubes or elements interface is considered the bonding region.

DETAILED DESCRIPTION

The bond of the present invention is obtained by high-temperature processing which achieves liquefaction and reflow of a thermoplastic polymer in the bond region. The thermoplastic polymer is chosen from a class of polymers which demonstrate a high degree of chemical inertness at room temperature, which class includes the polyaryl ether ketones. The polymer is further selected based on its ability to generate a suitable bond with the substrates comprising the tubes and elements, that bond being required to withstand the imposed mechanical and hydraulic stresses and to maintain a fluid-tight seal. One such polymer is polyether ether ketone (PEEK). The stiffness and strength of PEEK are useful in achieving structures capable of elevated pressure operation. Depending upon the service requirements, alternate chemically inert thermoplastic polymers may be employed. Those polymers include the melt-processable or thermoplastic fluoropolymer materials such as fluorinated ethylene-propylene (FEP), perfluoroalkoxy tetrafluoroethylene (PFA), and ethylene tetrafluoroethylene (ETFE). The class of useful polymers further includes the thermoplastic polyimides, polyphenylenes, and polyolefins.

Appropriately configured tubes are assembled in the desired positions. Depending upon the bond geometry, the tube positions are maintained with or without external fixturing. If fixturing is used it is generally out of contact with the polymer to insure it is not also bonded to the joint. The joint parts should be reasonably clean and free of surface contamination. It is generally not necessary to etch, prime, or otherwise modify the surfaces to be bonded, but the option of performing surface modification to increase bond surface area, obtain mechanical keying, or to achieve chemical activation of the surface is available.

The polymer is introduced to the joint by any suitable means including positioning a preform or from a filler rod as or after the joint is heated. The preforms can take any variety of shapes as suits the geometry of the joint including ribbons, fillers, films or rings. In a preferred embodiment, the polymer is supplied to the bond area as a preform, in a manner analogous to that used in brazing. The term preform as used herein should not be limited to any specific form but is used merely to describe a joint provided with a portion of the polymer in some way prior to or as the joint is heated. The bond region is the surface area where bonding occurs on each of the components. The bonding area of the joint should be large enough that the stresses resulting from in-use loads can be accommodated.

Preferably, the joint should be designed with containment of the molten polymer in mind. Since once the polymer cools, it tends to adhere to most things it contacts at its bonding temperature, the joint should be self-fixturing or the molten polymer should be contained in a sacrificial container or enclosure. In self-fixturing, the parts to be bonded contain the liquefied polymer. A sacrificial enclosure may be made out of a thermally conductive material such as a metal foil which may either be left in place after the polymer cools down or machined away as necessary or desired.

The heat used to achieve component bonding may be supplied in any appropriate method, depending upon the geometry of the joint being bonded, and upon the requirements of any external fixturing. One method for localized heating can be attained by inserting the components into corresponding cavities in a block of aluminum or steel, and heating that block by means of resistive heater cartridges or a heated platen. Alternatively, the components and any necessary fixturing can be heated within an industrial oven. Other options for heating, such as ultrasonic or induction heating are available and any suitable method may be used. Any method of heat transfer may be used that attains the proper bonding temperature and environment.

The components to be bonded are preferably taken up to temperature over a timeframe of several minutes. This relatively slow heating cycle allows for good regulation of temperature as the setpoint is reached, and allows the polymer preform to liquefy in a predictable manner to produce a high quality joint, free of entrained air. Temperature overshoot is undesirable in this application since the polymer is being taken to a temperature where overshoot could result in thermal breakdown or decomposition of the material. One embodiment provides a non-oxidizing atmosphere during heating.

In a preferred embodiment incorporating PEEK as the thermoplastic polymer, the components are typically maintained at a temperature between 385° C. and 420° C. for 1 to 3 minutes, although the invention is not limited to such. This is the temperature at which the PEEK polymer will achieve proper bonding to the components. The heat source is then removed and the components are passively cooled to room temperature. Cooling may be accelerated by any suitable method that maintains the chemical and structural integrity of the bond and components.

The tubes of the invention can be transport tubes, LC columns or any other type of fluid conduit. The joints created should be low band-broadening connections, causing minimal dispersion to chromatographic bands transiting the joint region. It is important to the invention that the bond geometry is configured such that the liquid polymer does not flow under adjoining tube ends and obstruct the fluid communication or other desired communication, such as heat transfer, between tubes. This is accomplished in part by regulating the amount of polymer introduced to the bond region, the joint geometry and the heating and cooling cycles the bond region undergoes. While it is possible and sometimes preferred that the polymer flow between the bond end and a planar side for instance, the polymer should not obstruct the fluid communication between tubes.

The figures are only representative of several of the many embodiments the invention can take. FIG. 1 shows a cross section of larger internal diameter tube end 10 passing to a smaller diameter transport tube 12. The two tubes are bonded together using the method of the present invention. The tube at the distal end 14 is the enclosure for a packed column typical for liquid chromatography applications. The column is bonded to a transport tube 12 at the proximal end. Due to its larger internal diameter, the column outlet 16 functions as a sleeve around the smaller outer diameter of the transport tube 12. The tubes are positioned in substantial contact with a polymer sleeve or ring preform 18 that fits between the column 14 and the transport tube 12 in the region where they overlap. The bond region is brought up to the appropriate temperature by placing it within a cavity of an aluminum housing (not shown) designed to hold the bond region and adequately heating this housing. The heat is subsequently removed and the bond region is passively cooled forming a bond that is fluid tight between the two tubes.

Alternatively, this joint may be created by introducing the polymer from a filler rod. This technique is similar to the known technique for the welding of metals where a filler rod is used. The polymer is adequately heated while the filler rod is removed. The polymer is subsequently cooled forming the bond.

The liquefied polymer may or may not need to be contained. If configured properly, this joint may function as a self-contained, and therefore, self-fixturing configuration. Otherwise, the liquefied polymer may be contained in a sacrificial enclosure.

Figure 2:
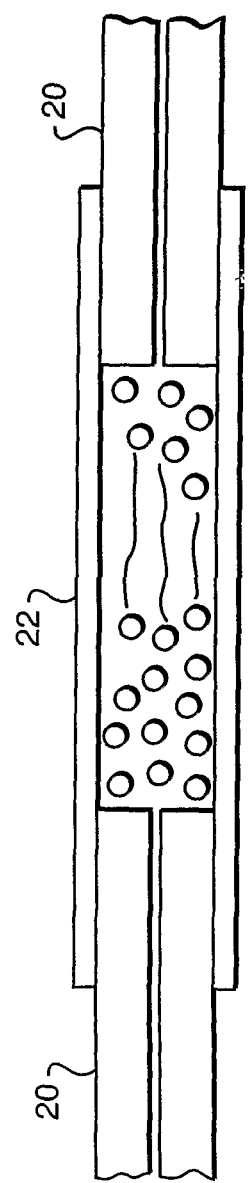

FIG. 2 is the cross section of a known configuration of a trapping column application. Here, two smaller outer diameter tubes 20 are sleeved by a larger internal diameter packed trapping column 22. The polymer may be introduced, heated and cooled to the bond region as in the previous example.

Figure 3A:
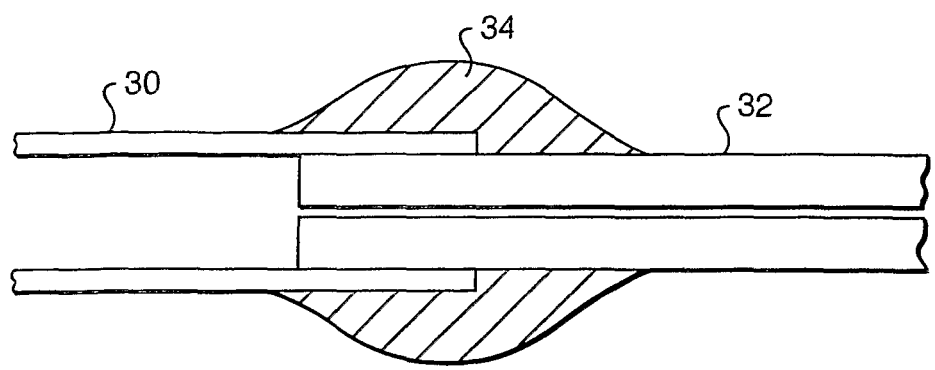

FIG. 3 depicts the cross section of examples of bonds at bond regions. In FIG. 3(a), a fluid tight seal is formed between a distal tube 30 with a greater internal diameter than the outer diameter of a proximal tube 32. Thus the proximal tube 32 nests within the distal tube 30. The bond 34 is a free surface that sufficiently surrounds the junction of the two tubes creating a structurally robust and fluid tight seal between them.

Figure 3B:
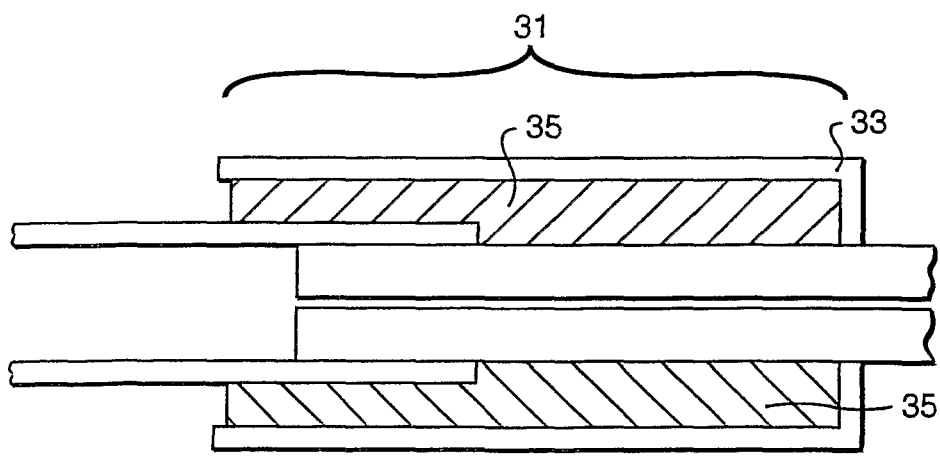

FIG. 3(b) shows an alternative bond to that in FIG. 1. The tubes of FIG. 3 are positioned similarly to FIG. 1 but the bond region is formed along the outside of the interface of the two tubes and additional portions of each tube 31. A sacrificial sleeve 33 is used to contain the liquefied polymer. The sleeve 33 is preferably constructed from a metal foil that may be machined away or left in place. However, a more permanent sleeve or any other design that would contain the liquefied polymer may be used. The bond 35 is created to encase the overlapped region of the tubes plus additional area of each to tube to insure a sufficiently large bonding region.

Figure 4:
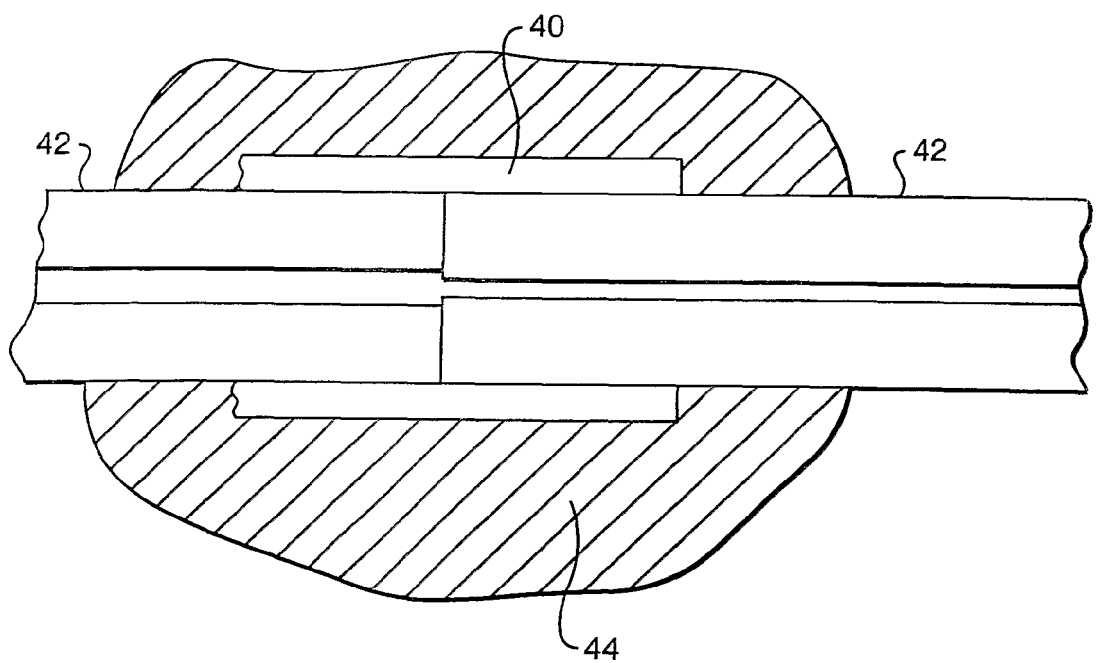

FIG. 4 is a cross section of a further embodiment that utilizes an alignment sleeve 40 to join and align two tubes 42 with equal outer diameters. The internal diameters of the tubes may be the same or different. In the embodiment of FIG. 4 different internal diameters are shown. The alignment sleeve 40 is commonly a precision bore quartz sleeve but may be any appropriate material and size. The bond 44 of FIG. 4 is formed around the external surfaces of the two tubes 42 and the sleeve 40, encasing the entire bond region to insure a fluid tight seal and a robust and sturdy bond. A sacrificial container is not depicted in FIG. 4 but could have been used to contain the liquefied polymer. Alternatively, the bond could have been created using a self-contained geometry.

Figure 5:
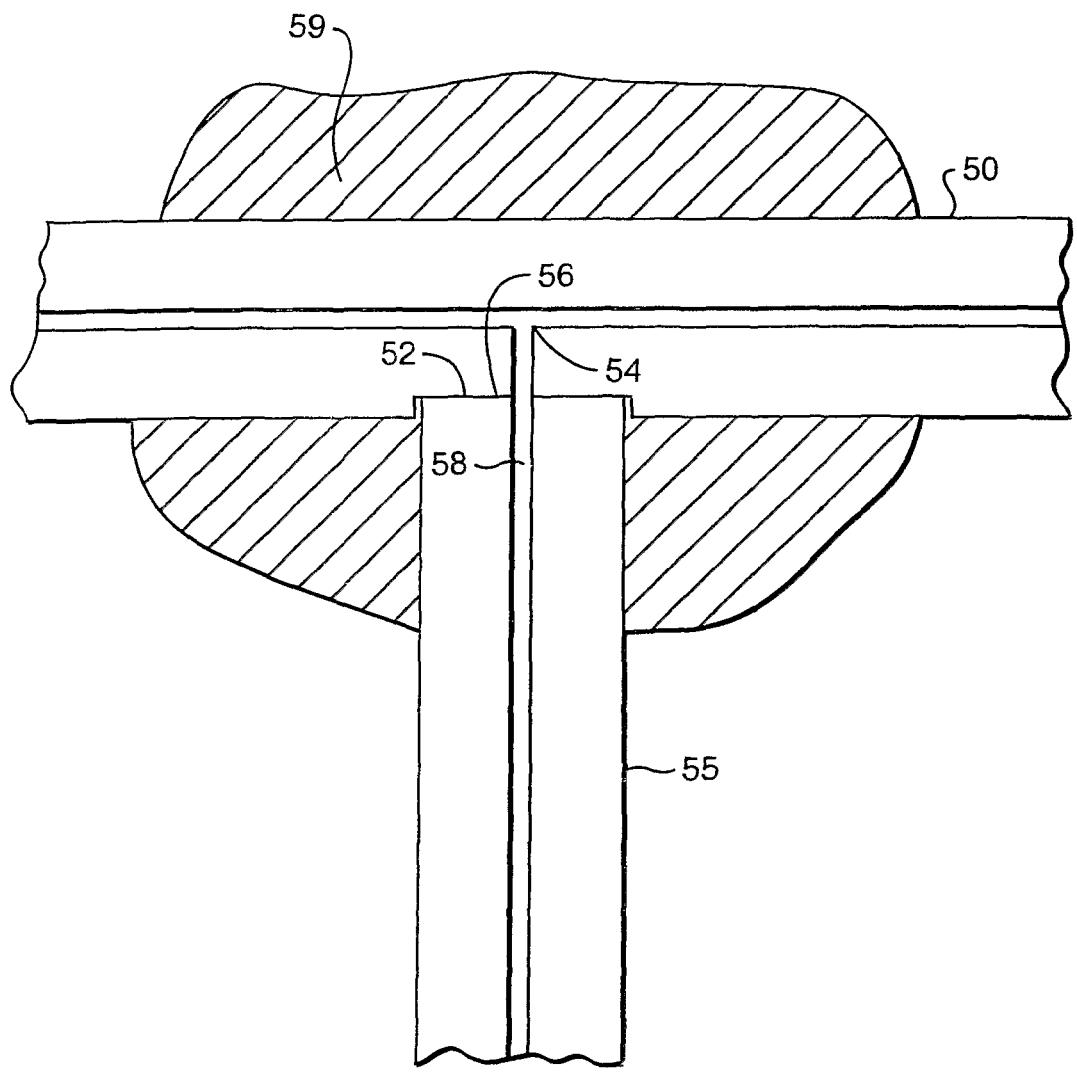

FIG. 5 depicts a cross section of a side-ported tube 50 with a ground in flat 52. The lumen of the side ported tube 50 is intercepted by a hole 54 drilled through the tube's side. An exterior portion of the side ported tube 50 has been ground substantially planar 52 for an adjoining tube end 56 to sit. The planar portion 52 is large enough for the adjoining tube end 56 to sit within and is substantially centered around the drilled hole 54. The drilled hole 54 is aligned with the lumen of the adjoining tube 55 to provide fluid communication between the side ported tube 50 and the adjoining tube 55. The bond 59 surrounds the external surfaces of the joint between the side ported tube 50 at the planar portion 52 and the adjoining tube end 56 sufficiently enough to form a fluid seal and a robust bond.

Figure 6:
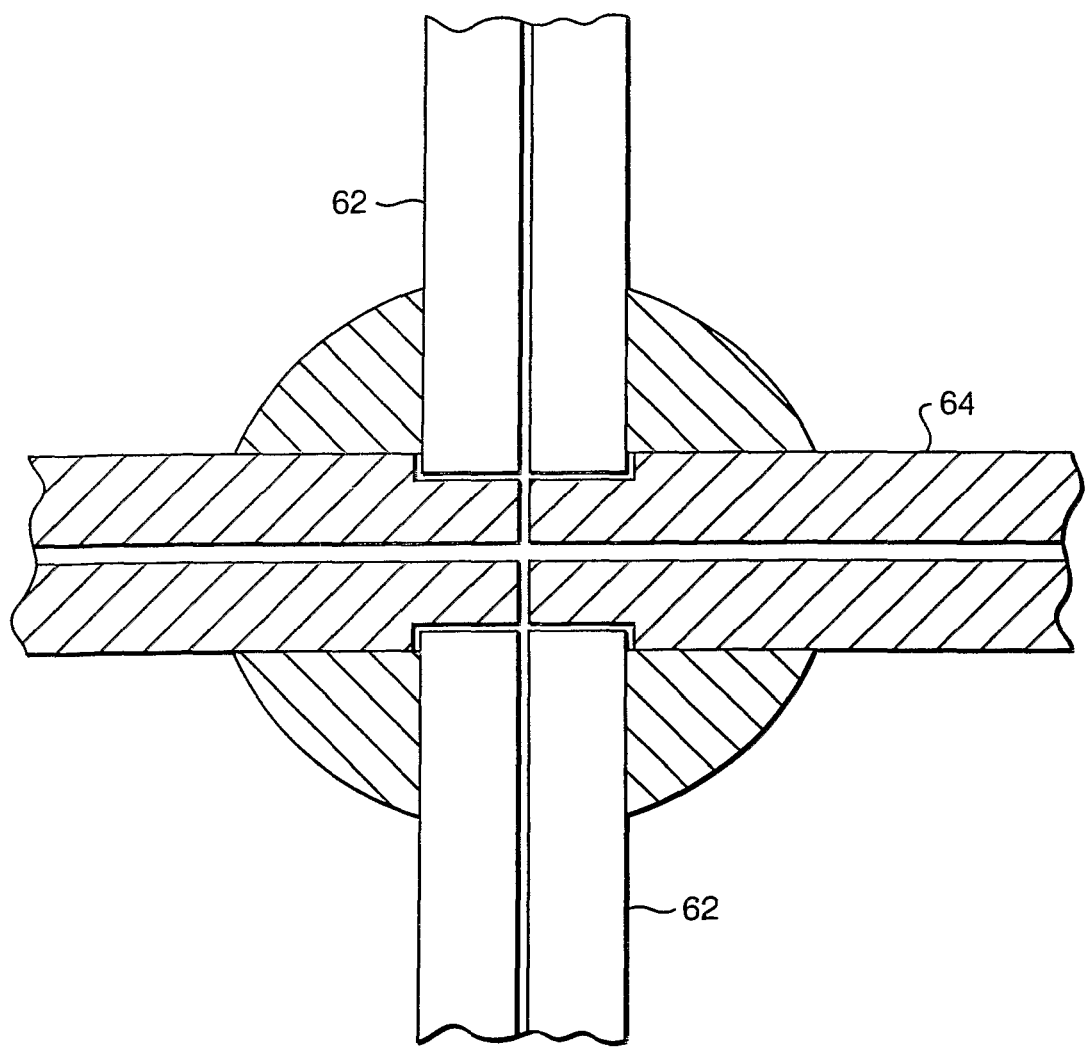

In FIG. 6 an alternative embodiment to the side ported tube of FIG. 5 is shown. As shown in cross section, this embodiment has two adjoining tubes 62 in substantially opposite relation to each other on a transport tube 64. Among the applications for this type of embodiment are reagent addition or solvent combining.

Figure 7:
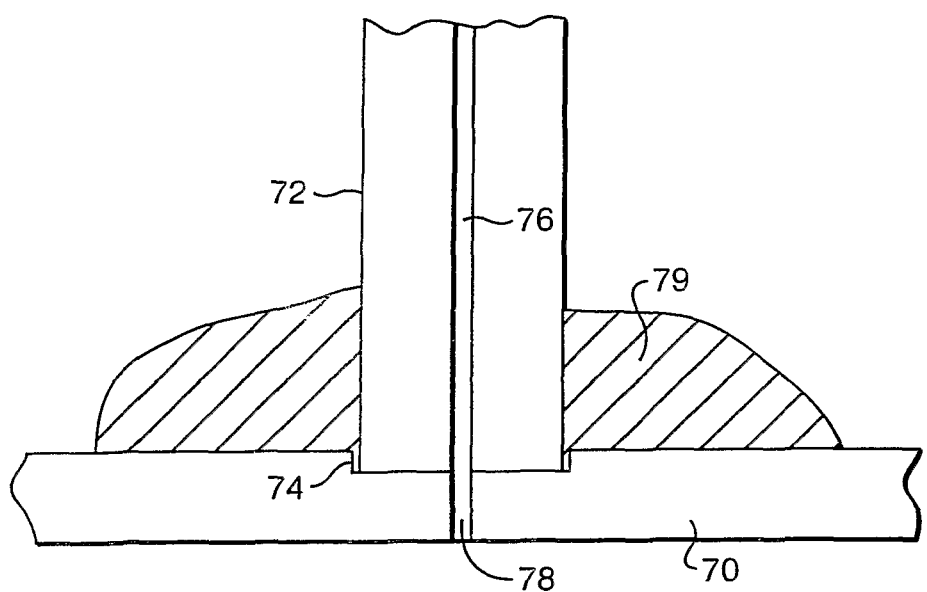

A further embodiment of the present invention is depicted in FIG. 7. This figure shows in cross section a tube-to-planar structure joint. The planar structure 70 can be of any material. A tube 72 is placed in a substantially planar seat 74 drilled or ground into the planar structure 70. The planar structure 70 may or may not have a drill hole through it. The seat 74 may be used as a registration feature to align the lumen 76 of the tube with a drill hole 78 in the planar structure 70. The bond 79 is created by either placing a preform around the outer geometry of the joint or using a filler rod technique and following the heating and cooling regime of the present invention.

Figure 8:
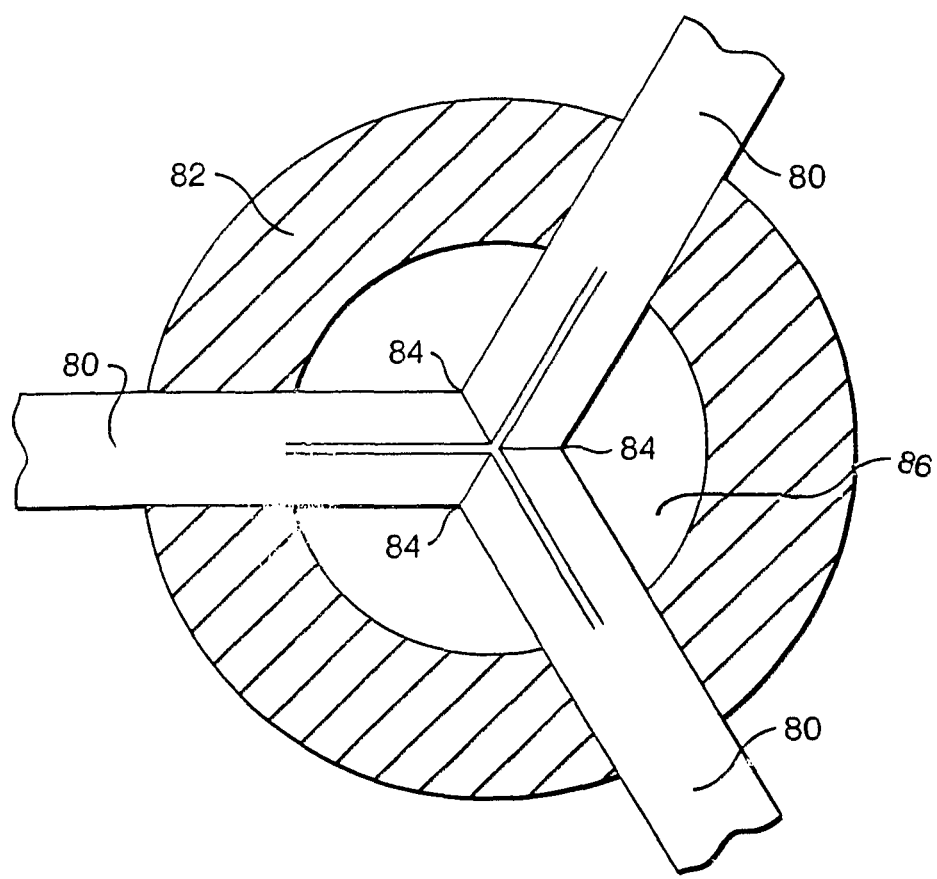

A three-tube joint is shown in FIG. 8. The tubes 80 can rest in V-grooves or use some other alignment feature in alignment guide 82. Liquefied polymer is used to fill the central cavity 86 of the alignment guide 82. The resulting bond rigidly maintains the alignment of the tube ends 84 for fluid communication between them.

Figure 9:
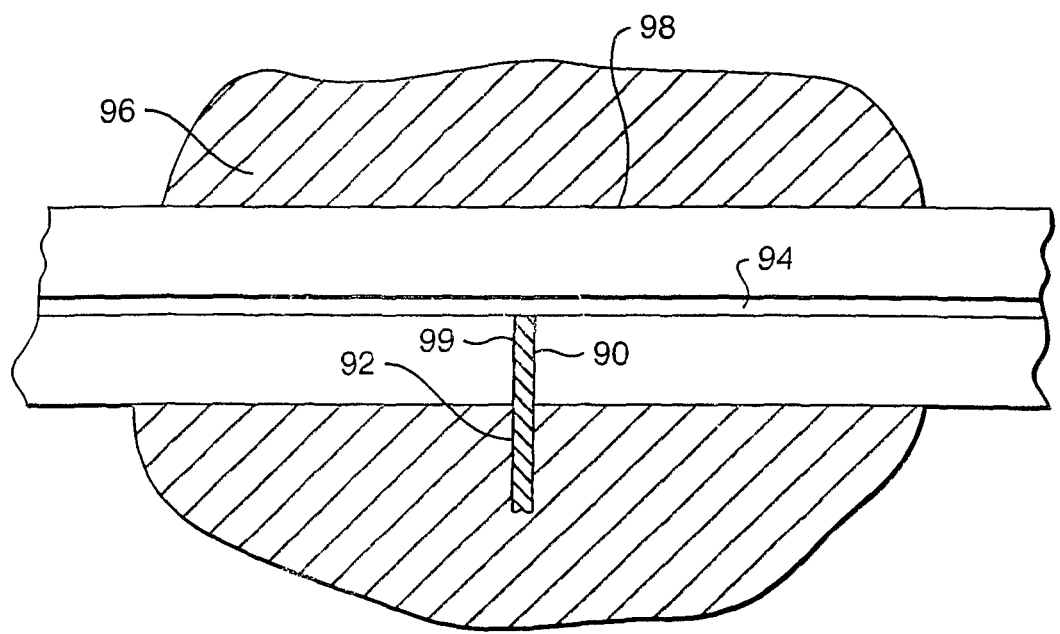

In FIG. 9, a side port 90 in a tube is used to introduce a metal electrode 92 in electrical contact with a fluid stream through the tube lumen 94. As shown in this cross section, the bond 96 may be created surrounding the joint between the electrode 92 and the outer surface of the tube 98. Alternatively, the bond may be contained by using the self-fixturing bond region provided by the drilled hole 99. This may be accomplished by a polymer preform being placed in the drill hole 99 along with the metal electrode 92 before being brought up to temperature and cooled.

These and other joint embodiments are possible from the method of the present invention. Importantly, the bonds must create substantially fluid tight seals and should not interfere with the flow of fluid through the tubes. The bonds should be chemically inert and mechanically strong since they typically are required to withstand the imposed mechanical and hydraulic stresses while maintaining the seal. The polymer is selected, among other criteria, on its ability to generate a suitable bond with the substrates comprising the tubes. Accordingly, it should be readily appreciated that the method of the present invention has many practical applications. Additionally, although the preferred embodiments have been illustrated and described, it will be obvious to those skilled in the art that various modifications can be made without departing from the spirit and scope of this invention. Such modifications are to be considered as included in the following claims.

What is claimed is:

1. A method of bonding a first fluid conduit to one or more other fluid conduits comprising:
positioning a first fluid chromatography conduit portion substantially in contact with at least one other fluid chromatography conduit portion to form a substantially direct interface between the first fluid chromatography conduit portion and the at least one other fluid chromatography conduit portion;
heating a bond region at a surface of each of the first fluid chromatography conduit portion and the at least one other fluid chromatography conduit portion;
externally applying a solid thermoplastic polymer to the bond region;
liquefying the solid thermoplastic polymer, wherein each of the first and at least one other fluid chromatography conduit portions is heated to a temperature at which the solid thermoplastic polymer liquefies, without melting the conduit portions;
maintaining the first and at least one other chromatography conduit portions at the temperature for a predetermined amount of time to achieve liquefying of the thermoplastic polymer and bonding of the thermoplastic polymer to the first and at least one other chromatography conduit portions; and
cooling the liquefied thermoplastic polymer to form a substantially fluid tight bond at the bond region between the first fluid chromatography conduit portion and the at least one other fluid chromatography conduit portion, wherein the cooled thermoplastic polymer surrounds the interface.

2. A method of bonding as in claim 1 wherein:
the position of the first fluid chromatography conduit portion to the at least one other fluid chromatography conduit portion creates a low band broadening joint.

3. A method of bonding as in claim 2 wherein:
the low band broadening joint results from the substantially direct interface between the lumens of the first fluid chromatography conduit portion and the at least one other fluid chromatography conduit portion.

4. A method of bonding as in claim 2 wherein:
the internal diameters of the conduit portions are substantially equal.

5. A method of bonding as in claim 2 wherein:
the internal diameter of the first conduit portion is larger than the internal diameter of the at least one other conduit portion.

6. A method of bonding as in claim 1 wherein:
the first fluid chromatography conduit portion and the at least one other fluid chromatography conduit portion are conduit openings joined to form a fluid tight joint.

7. A method of bonding as in claim 1 wherein:
the at least one other conduit portion is joined to a substantially planar outer surface portion of the first fluid conduit portion.

8. A method of bonding as in claim 1 wherein:
the first fluid conduit portion is positioned within a second fluid conduit portion of the at least one other fluid conduit portion.

9. A method of bonding as in claim 1 wherein:
the at least one other fluid chromatography conduit portion is a second portion of the first fluid chromatography conduit.

10. A method of bonding as in claim 1 wherein:
the liquefied thermoplastic polymer is contained around the bond region by an enclosure.

11. A method of bonding as in claim 10 wherein:
the enclosure is thermally conductive.

12. A method of bonding as in claim 10 wherein:
the enclosure is a metal foil.

13. A method of bonding as in claim 1 wherein:
the liquefied thermoplastic polymer is introduced to the bond region by positioning it at the bond region as a preform.

14. A method of bonding as in claim 1 wherein:
the conduits are made of fused silica.

15. A method of bonding as in claim 1 wherein:
the polymer is liquefied in a non-oxidizing atmosphere.

16. A method of bonding as in claim 1 wherein:
the polymer is selected from the group consisting of the polyaryl ketones, thermoplastic fluoropolymers, polyimides, polyphenylenes, and polyolefins.

17. A method of bonding as in claim 16 wherein:
the polyaryl ketone is a polyaryl ether ketone.

18. A method of bonding as in claim 17 wherein:
the polyaryl ether ketone is polyether ether ketone.

19. A method of bonding as in claim 1 further comprising:
modifying a surface of the conduit portions at a joint by etching or priming to increase bond surface area, obtain mechanical keying, or to achieve chemical activation of the surface.

20. The method of bonding as in claim 1 further comprising:
positioning an alignment sleeve on the first fluid chromatography conduit portion and the at least one other fluid chromatography conduit portion at the bonding region.

21. The method of bonding as in claim 20, wherein the thermoplastic polymer encases the alignment sleeve.

22. A method of forming a fluid-tight seal at a conduit joint, comprising:
positioning a first conduit portion substantially in contact with a second conduit portion to form a junction at the first conduit portion and the second conduit portion;
positioning an alignment sleeve on the first conduit portion and the second conduit portion;
externally applying a solid thermoplastic polymer to a bond region that includes an outer surface of each of the first conduit portion, the second conduit portion, and the alignment sleeve;
liquefying the solid thermoplastic polymer, wherein each of the first and second conduit portions is heated to a temperature at which the externally applied solid thermoplastic polymer liquefies, without melting the conduit portions;
wetting the bond region with the liquefied thermoplastic polymer externally applied to the bond region;
maintaining the first and second conduit portions at the temperature for a predetermined amount of time to achieve liquefying of the thermoplastic polymer and bonding of the thermoplastic polymer to the first and second conduit portions; and
cooling the thermoplastic polymer to form a substantially fluid-tight seal at the bond region about the outer surfaces of the first conduit portion, the second conduit portion, and the alignment sleeve.

* * * * *